United States Patent [19]
Yee et al.

[11] Patent Number: 5,946,384
[45] Date of Patent: Aug. 31, 1999

[54] ON HOLD CALL WAITING DISPLAY METHOD AND APPARATUS

[75] Inventors: Bruce William Yee; Leonard George Bleile, both of Alberta, Canada

[73] Assignee: Northern Telecom Limited, Montreal, Canada

[21] Appl. No.: 08/827,121

[22] Filed: Mar. 27, 1997

[51] Int. Cl.$^6$ .................................................. H04M 3/42
[52] U.S. Cl. ........................................ 379/215; 379/142
[58] Field of Search .................................. 379/215, 142, 379/202

[56] References Cited

U.S. PATENT DOCUMENTS

| | | | |
|---|---|---|---|
| 5,007,076 | 4/1991 | Blakley | 379/67 |
| 5,263,084 | 11/1993 | Chaput et al. | 379/215 |
| 5,649,002 | 7/1997 | Brady et al. | 379/215 X |

FOREIGN PATENT DOCUMENTS 2 258 119   1/1993   United Kingdom ............ H04M 1/57

OTHER PUBLICATIONS

International Application Published Under the Patent Cooperation Treaty (PCT), Publication No. WO 96/25816, Publication Date Aug. 22, 1996. PCT International Application Serial No. PCT/US96/01115 filed Feb. 12, 1996. Title: Caller ID and Call Waiting for Multiple CPEs on a Signal Telephone. Applicant: CIDCO, Incorporated.

IEEE Communications Magazine. vol. 31, No. 4, Apr. 1, 1993, New York, United States. Title of Article: "The Analog Display Services Interface". pp. 70–75. Author: Barry K. Schwartz.

Primary Examiner—Creighton Smith

[57] ABSTRACT

A method and apparatus for notifying a user of a call waiting while a telephone is on hold. A transmit signal path and a receive path between a central office line and transmitter and receiver elements in the telephone are muted to place a call on hold. A customer premise equipment alerting signal is received from the central office while the transmit signal path and receive path are muted. The receive path is un-muted after the customer premise equipment alerting signal is received and an audible message signal is generated and inserted into the receive path in response to the customer premise equipment alerting signal to notify a user that the customer premise equipment alerting signal has been received. The receive path is then re-muted.

28 Claims, 4 Drawing Sheets

ON HOLD CALL WAITING DISPLAY METHOD AND APPARATUS

BACKGROUND OF THE INVENTION

This invention relates to spontaneous call waiting identification (SCWID) in connection with a telephone on hold.

Currently, spontaneous call waiting identification (SCWID), is provided in many telephones and adjuncts to telephones. Typically, when a central office wishes to send SCWID information to a telephone, the central office sends to the telephone a subscriber alerting signal (SAS) audibly recognized by the user and a customer premise equipment alerting signal (CAS) which is detected by a customer premise equipment alerting signal receiver at the telephone. The telephone typically responds to the customer premise equipment alerting signal by muting a receive path in the telephone while providing an acknowledgment signal in a dual-tone multi-frequency (DTMF) format and receives FSK data from the central office. Such muting protects the user's ears from the relatively loud tones of the CAS, DTMF signals and FSK signals. It is a requirement of prior art systems that the user be actively listening to signals from the central office for the subscriber alerting signal to be heard by the telephone user.

When a telephone is placed on hold, the user is often not able to hear signals transmitted by the central office and therefore, would not be able to hear subscriber alerting signals provided by the central office, until the telephone is taken off hold. Thus, in a telephone on hold, a user may not be properly informed that a call is waiting.

The present invention provides for signalling the user in response to CAS signals, while the telephone is on hold.

BRIEF SUMMARY OF THE INVENTION

In accordance with one aspect of the invention, there is provided a method of notifying a user of a call waiting while a telephone is on hold. The method includes the steps of: a) muting a transmit signal path and a receive path between a central office line and transmitter and receiver elements in the telephone, b) receiving a customer premise equipment alerting signal front the central office while the transmit signal path and receive path are muted, c) un-muting the receive path after the customer premise equipment alerting signal is received, and d) generating and inserting an audible message signal into the receive path in response to the customer premise equipment alerting signal to notify a user that the customer premise equipment alerting signal has been received, and re-muting the receive path.

Preferably, the method includes the step of reducing the gain of a gain controlled receive amplifier in the receive signal path after the customer premise equipment alerting signal is received, increasing the gain of the gain controlled receive amplifier before inserting the audible message signal and reducing the gain of the gain controlled receive amplifier after the audible message signal has been inserted.

Preferably, the step of inserting includes the step of summing the audible message signal into the receive path.

Preferably, the step of summing is performed prior to a gain controlled receive amplifier in the receive path.

Preferably, the method includes the steps of reducing the gain of the gain controlled receive amplifier after the customer premise equipment alerting signal is received, increasing the gain of the gain controlled receive amplifier before inserting the audible message signal and reducing the gain of the gain controlled receive amplifier after the audible message signal has been inserted.

Preferably, the audible message includes a tone signal and preferably, the tone signal has a frequency of approximately 440 Hertz.

Optionally, the audible message includes a synthesized voice message.

In accordance with another aspect of the invention, there is provided a apparatus for enabling a central office to notify a user of a call waiting in a telephone on hold. The apparatus includes a central office line termination, a receive element for providing audible signals to a user of the telephone, a transmit element for receiving audible signals from a user of the telephone, a receive signal path between the central office line termination and the receive element and a transmit signal path between the central office line termination and the transmit element. The apparatus further includes; a) a customer premise equipment alerting signal receiver in communication with the receive signal path for receiving a customer premise equipment alerting signal from the central office, b) a generator in communication with the receive signal path for generating and inserting an audible message signal into the receive signal path after the customer premise equipment alerting signal is received, and c) a mute controller in communication with the transmit signal path and receive signal path for muting the transmit signal path and the receive signal path to place the telephone on hold, for un-muting the receive signal path while the audible message signal is inserted into the receive signal path and for re-muting the receive signal path after the audible message signal has been inserted.

Preferably, the apparatus includes a gain controlled receive amplifier in the receive signal path and is controlled by the mute controller such that the gain of the gain controlled receive amplifier is reduced after the caller alert signal is received.

Preferably, the mute controller increases the gain of the gain controlled receive amplifier before the audible message signal is inserted, and reduces the gain of the gain controlled receive amplifier after the audible message signal has been inserted.

Preferably, the apparatus includes a summer for summing the audible message signal produced by the generator into the receive signal path.

Preferably, the apparatus includes a gain controlled receive amplifier in the receive signal path the gain controlled receive amplifier being controlled by the mute controller such that the gain of the gain controlled receive amplifier is reduced after the customer premise equipment alerting signal is received.

Preferably, the summer is positioned in the receive signal path prior to the gain controlled receive amplifier.

Preferably, the mute controller increases the gain of the gain controlled receive amplifier before the audible message signal is inserted and reduces the gain of the gain controlled receive amplifier after the audible message signal has been inserted.

Preferably, the audible message includes a tone signal having a frequency of approximately 440 Hertz.

Preferably, the audible message includes a synthesized voice message.

Preferably, the mute controller is in communication with the transmit signal path and receive signal path for muting the transmit signal path and the receive signal path to place the telephone on hold.

BRIEF DESCRIPTION OF THE SEVERAL VIEWS OF THE DRAWING

In drawings which illustrate embodiments of the invention.

DETAILED DESCRIPTION OF THE INVENTION

Figure 1:
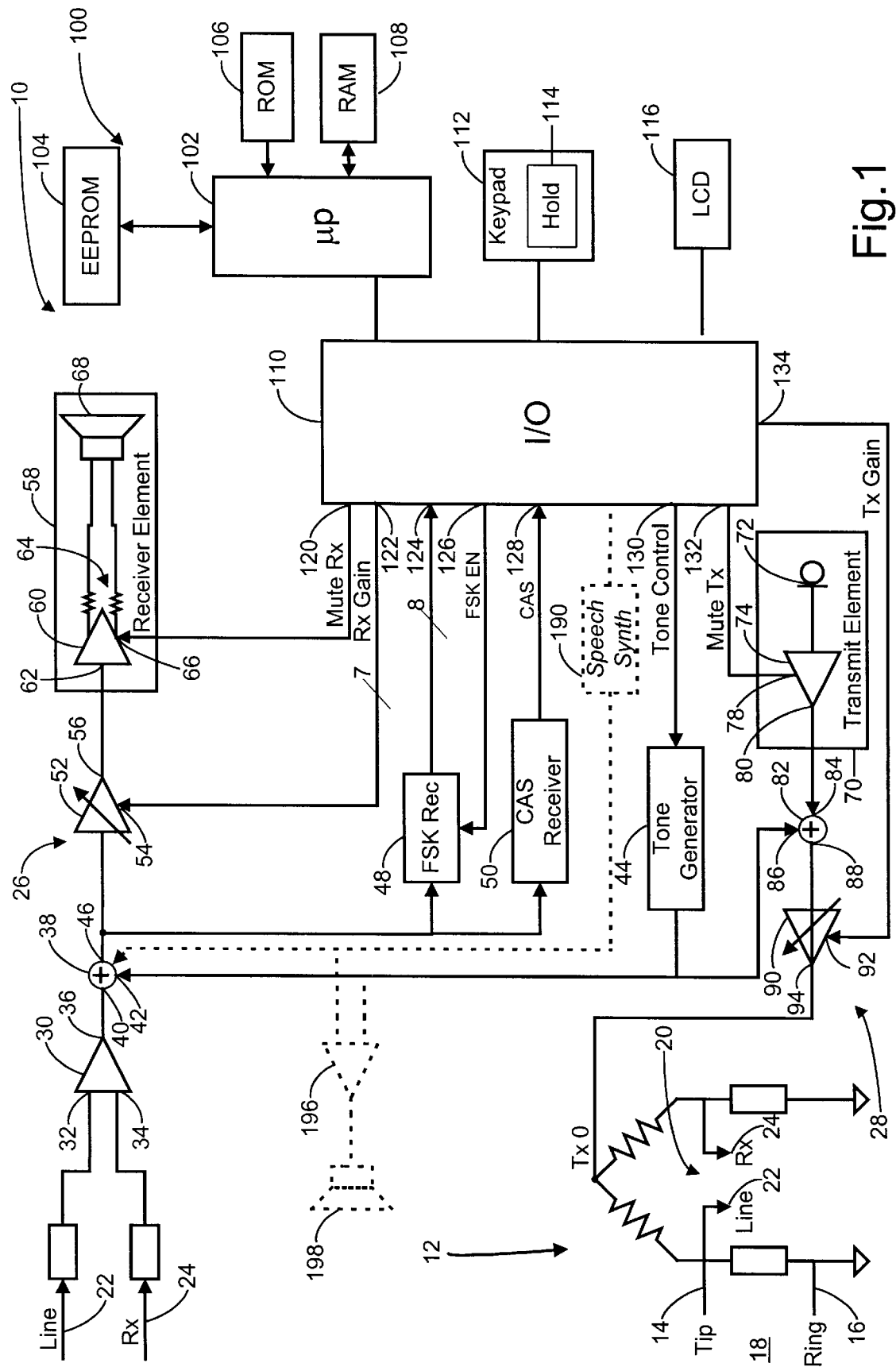
FIG. 1 is a block diagram of an apparatus for enabling a central office to notify a user of a call waiting in a telephone on hold, according to a first embodiment of the invention.

Referring to FIG. 1, an apparatus for enabling a central office to notify a user of a call waiting in a telephone on hold is shown generally at 10.

The apparatus is part of a telephone having a central office line termination 12 for connecting to conventional tip and ring connections 14 and 16 of a central office line 18. The central office line termination 12 includes a conventional hybrid transmission circuit 20 which is connected to the conventional tip and rig connection 14 and 16 of the central office line 18 and which provides line and receive signals 22 and 24 to a receive signal path 26 of the telephone. The hybrid transmission circuit 20 also receives transmission signals from a transmission path 28 of the telephone for transmission to the central office. Effectively, the hybrid circuit 20 couples the received signals directly to the receive signal path and couples a portion of the trans mission signals to the receive signal path 26 to allow a user to hear a portion of the signal being transmitted to the central office.

The receive signal path 26 includes a buffer amplifier 30 having inputs 32 and 34 for receiving signals from the line and receive signals 22 and 24 and an output 36 for providing a first stage receive signal. The receive signal path 26 further includes a first summing amplifier or first summer 38. The first summer has a first input 40 operable to receive the first stage output signal and has a second input 42 operable to receive a tone signal from a tone generator 44. The first summer 38 further has a first summer output 46 which is connected to a Frequency Shift Keying (FSK2) receiver 48, to a Customer premise equipment alerting signal CAS Receiver 50 and to a first gain controlled amplifier 52. The first summer output 46 produces a first summer signal which is the sum of the first stage receive signal and the tone signal.

The frequency shift keying receiver 48 receives from the receive signal path 26 frequency shift keyed calling line identification data (CLID) indicative of a caller waiting. The CAS receiver 50 is in communication with the receive signal path 26 for receiving a Customer promise equipment alerting signal (CAS) from the central office.

The first summer signal is applied to the first gain controlled amplifier 52. The first gain controlled amplifier 52 has a first gain control input 54 for receiving a signal operable to control the gain of the first gain controlled amplifier and has an output 56 which is connected to a receive element 58 for providing audible signals to a user of the telephone.

The receive element 58 includes a second gain controlled amplifier 60 having an input 62, an output 64 and a second gain control input 66. In this embodiment, the output is connected to a conventional speaker 68 in a handset of the telephone, but it will be appreciated that it may alternatively be connected to a transmitter in a cordless telephone or to a speaker in a speakerphone.

It will be appreciated that the receive signal path 26 extends between the central office line termination 12 and the receive element 58.

The transmit signal path 28 includes a transmit element 70, which in this embodiment includes a microphone 72 in the handset of the telephone, but which may alternatively be a receive circuit in a cordless telephone or a microphone in a speakerphone, for example. Generally, the transmit element 70 receives audible signals from a user of the telephone and the remainder of the transmit path processes these signals for transmission to the central office.

The transmit element 70 further includes a third gain controlled amplifier 74 having an input 76 for receiving a microphone signal from the microphone 72, a third gain control input 78 and an output 80 for producing a buffered audio signal.

The output 80 of the third gain controlled amplifier 74 is connected to a second summing amplifier 82 having a first input 84 for receiving the buffered audio signal, a second summer input 86 for receiving the tone signal from the tone generator 44, and an output 88 for producing a second summing output signal which is the sum of the buffered audio signal and the tone signal.

The second summing output signal is applied to a fourth gain controlled amplifier 90 having a fourth gain control input 92 and a fourth output 94. The fourth output is connected to the hybrid transmission circuit 20 and provides transmission signals thereto for transmission on the central office line 18 to the central office.

It will be appreciated that the transmit signal path 28 extends between the transmit element 70 and the central office line termination 12.

In this embodiment, the telephone further includes a microprocessor circuit 100 including a microprocessor 102, electrically erasable read only memory (EEPROM) 104 read only memory (ROM) 106 random access memory (RAM) 108 and an input/output (I/O) port 110. To the I/O port 110 is connected a telephone keypad 112 having a hold key 114, and a Liquid Crystal Display (LCD) 116.

The I/O port 110 further has a plurality of inputs and outputs which are connected to components of the transmit and receive paths 28 and 26, to the FSK receiver 48, to the CAS receiver 50 and to the tone generator 44. These include a first mute RX output 120 which is connected to the second gain control input 66 of the second gain controlled amplifier 60 to control the gain of that amplifier, an Rx gain output 122 which is connected to the first gain control input 54 of the first gain controlled amplifier 52 to control the gain of that amplifier, an FSK receiver input 124 for receiving bytes of data from the FSK receiver indicative of FSK Data received at the FSK receiver, an FSK enable output 126 for providing an FSK enable signal to the FSK receiver 48 to effectively switch the FSK receiver 48 on and off, a CAS input 128 for receiving a CAS active signal from the CAS receiver when a CAS signal is received from the central office, a tone control output 130 for providing bytes of data to the tone generator 44 to enable and specify the frequencies of the tone signal produced by the tone generator 44, a mute TX output 132 connected to the third gain control input 78 of the third gain controlled amplifier 74 to control the gain of that amplifier, and a transmit gain (TX) output 134 connected to the fourth gain control input 92 of the fourth gain control amplifier 90 for controlling the gain of that amplifier.

The microprocessor 102 reads from or writes to particular locations of the I/O port 110 to read or chance the status of the above outputs, according to algorithms implemented in microprocessor readable instruction codes stored in the ROM 106. These algorithms include a keypad interrupt algorithm and a user alerting algorithm shown in FIGS. 2 and 4, respectively.

Figure 2:
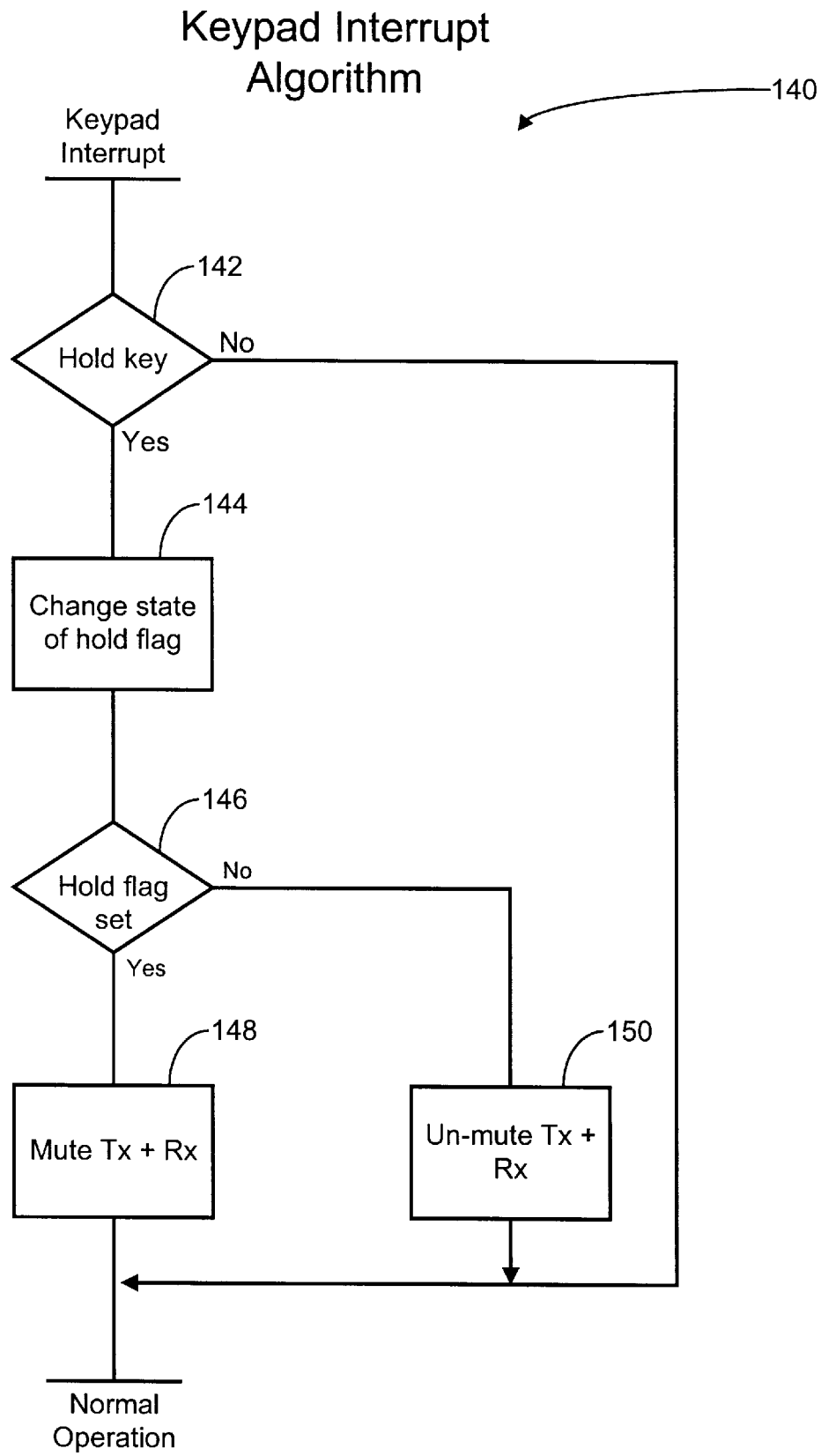
FIG. 2 is a flowchart depicting a keypad interrupt algorithm according to the first embodiment of the invention.

Referring to FIG. 2, the keypad interrupt algorithm is shown generally at 140. The algorithm is implemented by a plurality of blocks of microprocessor-readable instruction codes operable to implement various functional blocks of the algorithm.

Referring to FIGS. 1 and 2, the keypad interrupt algorithm 140 is entered by the microprocessor 102 upon receiving a keypad interrupt from the keypad 112. Block 142 of the algorithm directs the microprocessor to determine whether or not the hold key 114 on the keypad 112 has been depressed and if it has not been depressed, the keypad interrupt algorithm 140 is exited and normal operation of the telephone is resumed. Such normal operation may include other algorithms which respond to other keys on the key pad 112.

If at block 142 it is determined that the hold key 114 has been depressed, block 144 directs the microprocessor 102 to change the state of a hold flag code in a hold flag buffer (not shown) in RAM 108. In this example, assume that the hold flag code is set to active at this time as a result of the hold key 114 being depressed. Block 146 then reviews the contents of the hold flag buffer to determine whether or not the contents reflect an active hold flag code. If an active hold flag code is detected, processing continues with block 148 which directs the microprocessor 102 to write to the I/O port 110 to render the mute RX and mute TX outputs 120 and 132 active. When the mute RX and the mute TX outputs 120 and 132 are rendered active the second gain controlled amplifier 60 is disabled such that signals received from the central office line are not audible to the user. Similarly, signals produced by the microphone 72 are not amplified by the third gain controlled amplifier 74 and, therefore, no user uttered sounds are transmitted to the central office.

If at block 146 the microprocessor 102 determines that the hold flag code is not active, block 150 renders the mute RX 120 and the mute TX 134 outputs inactive which, referring to FIG. 1, renders the receive element 58 operational such that the user can hear signals on the receive path 26 and such that utterances made by the user are transmitted along the transmit path 28.

Figure 3:
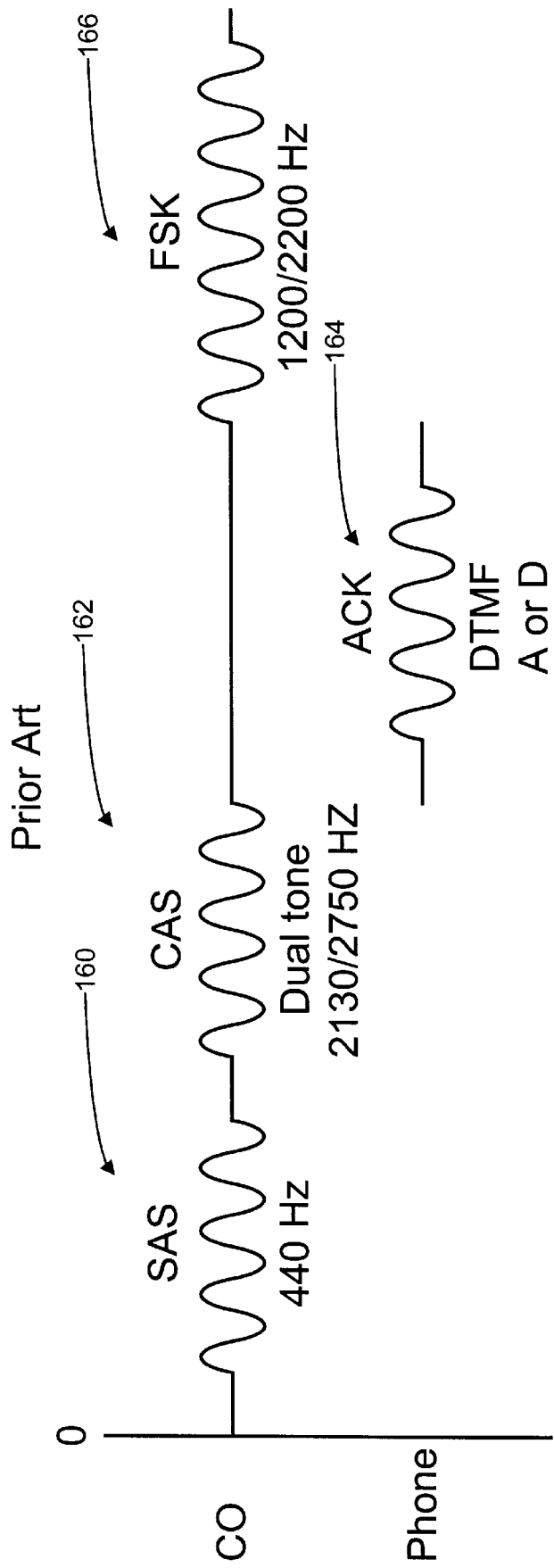
FIG. 3 is a timing diagram of signals produced by a central office and by a telephone in connection with spontaneous call waiting identification according to the first embodiment of the invention.

Referring to FIG. 3, as is conventional in the prior art, when the central office wishes to notify a subscriber telephone of calling line identification information, the central office sends to the subscriber's telephone, a subscriber alerting signal 160 having a frequency of approximately 440 Hz, which is audible to the user to alert the user that a caller is waiting. The central office then sends to the telephone a calling alerting signal 162 which is a dual tone signal having frequencies of 2130 and 2750 Hz, which activates circuitry within a telephone to respond with an acknowledgement signal 164 in the form of a dual-tone multi-frequency (DTMF) code A or D, depending on the type of telephone. The central office then responds to the acknowledgement signal 164 by sending information regarding the waiting caller's name and telephone number in the form of frequency shifted keyed data 166 shifted between 1200 and 2200 Hz. In most telephones, only the subscriber alerting signal 160 is heard by the user, the remaining signals sent by the central office ie., the CAS signal 162 and the FSK signals 166 are muted so that the user cannot hear these signals and is not disturbed by them.

However, when a telephone is placed on hold, the user cannot hear the subscriber altering signal 160 and therefore is not made aware of a call waiting. The user alerting algorithm shown in FIG. 4, effectively serves to detect the presence of the CAS signal 162 and to un-muto the receive path 26 to enable insertion of an audible message signal into the receive signal path so that the user can be alerted of the call waiting. The algorithm also re-mutes the receive signal path 26 after the audible message signal has been inserted.

Figure 4:
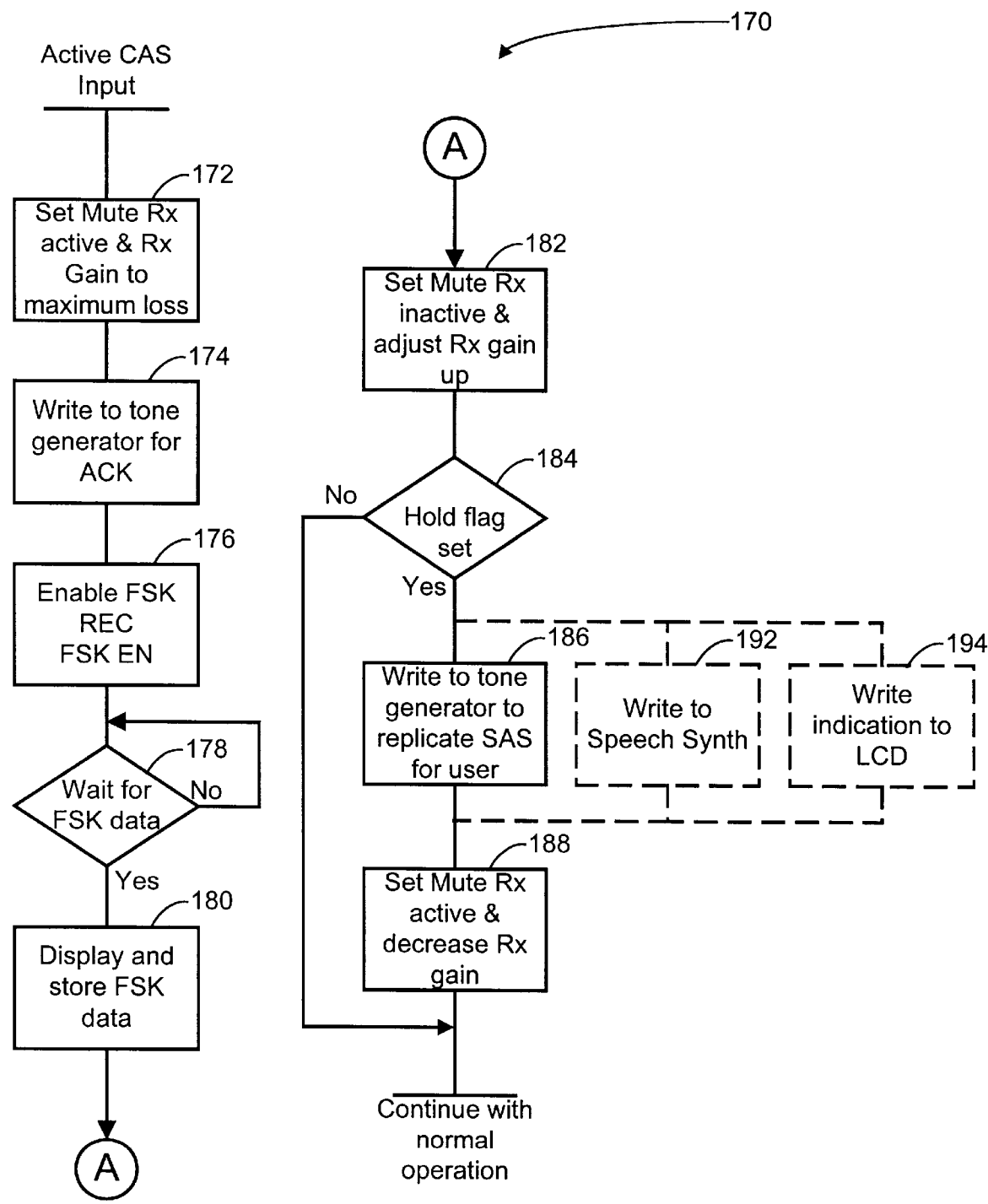
FIG. 4 is a flowchart of a user alerting algorithm according to the first embodiment of the invention.

Referring to FIG. 4, the user alerting algorithm is shown generally at 170. The algorithm is implemented by microprocessor readable codes stored in the ROM 106 shown in FIG. 1. These codes are arranged in blocks of code corresponding to functional blocks of the algorithm.

The microprocessor 102 also executes a main algorithm (not shown) which handles various functions including responding to keypresses, dealing with audio data, and other functions. The microprocessor also executes a polling algorithm (not shown) which polls the status of signals at the I/O port 110 by reading particular locations in the I/O port 110 as described above.

The polling algorithm directs the microprocessor to determine whether or not the CAS input 128 has received an active signal from the CAS receiver 50. If so, then the user alerting algorithm shown at 170 in. FIG. 4 is entered.

Referring to FIGS. 1 and 4, the user alerting algorithm begins with block 172 which directs the microprocessor 102 to write to the I/O port 110 to set the mute RX output 120 active and to set the RX gain output 122 to maximum loss. Thus, the receive element 58 is effectively muted or disabled and the first gain controlled receive amplifier 52 is set to apply minimum gain to the signal received from the central office.

Referring back to FIG. 4, block 174 then directs the microprocessor 102 to write to the I/O port 110 to cause the tone control output 130 to provide signals to the cone generator 44 to cause the tone generator 44 to produce the acknowledgment signal 154 shown in FIG. 3.

Referring back to FIGS. 1 and 4, the tone signal is applied to the second summer input 86 which sums the zone signal in the transmit path 28 and permits the tone signal to be transmitted to the central office.

Referring back to FIG. 4, block 176 then directs the microprocessor 102 to write to the I/O port 110 to set the FSK enable output 126 active to enable the FSK receiver 48 to receive FSK data as shown at 166 in FIG. 3.

Referring back to FIGS. 1 and 4, block 175 then directs the microprocessor 102 to enter a wait loop to wait for PSK data to be received at the FSK receiver 48. The FSK receiver 48 has a buffer (not shown) which is loaded with bytes of FSK data received and a completion signal is provided to the I/O port on the FSK receive lines 124.

Referring to FIG. 4, bock 178 waits for this completion signal to be produced. Thus, when the microprocessor 102 receives the completion signal from the FSK receiver 48, block 180 directs the microprocessor 102 to display and store the received FSK data on the liquid crystal display 116.

Block 182 then directs the microprocessor 102 to write to the I/O port 110 to set the mute RX output 120 inactive and to set the RX gain output 122 to maximum gain which effectively un-mutes the receiver element 58 and allows the first gain controlled amplifier 52 2to amplify signals on the receive path 26.

Block 184 then directs the microprocessor 102 to read the hold flag buffer (not shown) to determine whether or not the hold flag code is set active. If the hold flag code is not active, block 184 directs the microprocessor 102 to continue with normal operation. If, on the other hand, the hold flag code is active, block 186 directs the microprocessor 102 to write to the I/O port 110 to activate the tone control output 130 to cause the tone generator 44 to replicate the subscriber alerting signal shown in FIG. 3. Referring back to FIGS. 1 and 4, as the output of the tone generator 44 is connected to the first summer 38, in the receive path 26, the signals produced by the tone generator 44 are inserted into the receive path 26 and are amplified by the first gain controlled amplifier 52 and the second gain controlled amplifier 60 such that the tone is made available to the receive element 58 and in this embodiment, such that the user hears the tone so produced. After the tone has been produced, block 188 directs the microprocessor 102 to write to the I/O port 110 to set the mute RX output 120 active and to set the RX gain output 122 to minimum gain which effectively causes the first gain controlled amplifier to return to attenuating any further signals on the receive path 26 and causes the receive element to be muted. Referring back to FIG. 4, processing continues with normal operation which includes receiving the FSK data from the central office while the receive path is muted.

The tone generator thus acts as a generator in communication with the receive signal path for generating and inserting an audible message signal into the receive signal path after the customer premise equipment alerting signal is received. The mute controller increases the gain of the gain controlled receive amplifier before the audible message signal is inserted and reduces the gain of the gain controlled amplifier after the audible message signal has been inserted.

Alternatives

In accordance with an alternative embodiment of the invention, the circuit of FIG. 1 is further provided with a speech synthesizer 190 connected to the I/O port 110 and operable to provide a synthesized speech signal to the first summer 38 in the receive path. In this embodiment, block 186 in FIG. 4 is replaced with block 192, which directs the microprocessor 102 co write to the speech synthesizer 190 to produce the synthesized speech signal which is inserted into the receive path by the summer 38 such that the user hears synthesized speech to indicate that a call is waiting.

In a further alternative embodiment, block 186 of FIG. 4 is replaced with block 194 which directs the microprocessor to write to the I/O port 110 to cause the LCD 116 to display an indication hat a call is waiting.

In a further alternative embodiment of the invention, blocks 186 and 194 are both included in the user alerting algorithm such that the user is able to receive a visual indication that a call is waiting on the liquid crystal display 116 and can hear an audible indication that a call is waiting.

In yet a further alternative embodiment, the apparatus may include a loudspeaker amplifier 196 and a loudspeaker 198 and the audible message may be rendered audible through the loudspeaker by connecting the tone generator and/or speech synthesizer to the loudspeaker amplifier.

It will be appreciated that by enabling a CAS receiver to receive data from the central office, at a point early in the receive signal path, before circuitry that mutes the receive signal path, call waiting information can be detected and an indication of the user can be readily provided while a telephone is on hold.

While specific embodiments of the invention have been described and illustrated, such embodiments should be considered illustrative of the invention only and not as limiting the invention as construed in accordance with the accompanying claims.

What is claimed is:

1. A method of notifying a user of call waiting while a telephone is on hold, the method including the steps of:
    a) muting a transmit signal path and a receive signal path between a central office line and transmitter elements and receiver elements in said telephone;
    b) receiving a customer premise equipment alerting signal from said central office while said transmit signal path and receive signal path are muted;
    c) un-muting said receive signal path after said customer premise equipment alerting signal is received;
    d) generating and inserting an audible message signal into said receive signal path in response to said customer premise equipment alerting signal to notify a user that said customer premise equipment alerting signal has been received; and
    e) re-muting said receive signal path.

2. A method as claimed in claim 1 further including the step of reducing gain of a gain controlled receive amplifier in said receive signal path after said customer premise equipment alerting signal is received.

3. A method as claimed in claim 2 further including the step of increasing the gain of said gain controlled receive amplifier before inserting said audible message signal.

4. A method as claimed in claim 3 further including the step of reducing the gain of said gain controlled receive amplifier after said audible message signal has been inserted.

5. A method as claimed in claim 1 wherein the step of inserting includes the step of summing said audible message signal into said receive signal path.

6. A method as claimed in claim 5 wherein the step of summing is performed prior to a gain controlled receive amplifier in said receive signal path.

7. A method as claimed in claim 6 further including the step of reducing gain of said gain controlled receive amplifier after said customer promise equipment alerting signal is received.

8. A method as claimed in claim 7 further including the step of increasing the gain of said gain controlled receive amplifier before inserting said audible message signal.

9. A method as claimed in claim 8 further including the step of reducing said gain of said gain controlled receive amplifier after said audible message signal has been inserted.

10. A method as claimed in claim 1 wherein said audible message includes a tone signal.

11. A method as claimed in claim 1 wherein said tone has a frequency of approximately 440 Hertz.

12. A method as claimed in claim 1 wherein said audible message includes a synthesized voice message.

13. An apparatus enabling a central office to notify a user of a call waiting in a telephone on hold, said telephone having a central office line termination, a receive element offerable to produce audible signals to a user of said telephone and transmitting said signals to said central office, a transmit element receiving audible signals from a user of said telephone, a receive signal path between said central office line termination and said receive element and a transmit signal path between said central office line termination and said transmit element, the apparatus comprising:
    a) a customer premise equipment alerting signal receiver in communication with said receive signal path offerable to receive receiving a customer premise equipment alerting signal from said central office;
    b) a generator in communication with said receive signal path generating and inserting an audible message signal into said receive signal path after said customer premise equipment alerting signal is received; and c) a mute controller in communication with said transmit signal path and receive signal path muting said transmit signal path and said receive signal path to place said telephone on hold, un-muting said receive signal path while said audible message signal is inserted into said receive signal path and re-muting said receive signal path after said audible message signal has been inserted.

14. An apparatus as claimed in claim 13 further including a gain controlled receive amplifier in said receive signal path and controlled by said mute controller such that the gain of said gain controlled receive amplifier is reduced after said customer premise equipment alerting signal is received.

15. An apparatus as claimed in claim 14 wherein said mute controller increases the gain of said gain controlled receive amplifier before said audible message signal is inserted.

16. An apparatus as claimed in claim 15 wherein said mute controller reduces the gain of said gain controlled receive amplifier after said audible message signal has been inserted.

17. An apparatus as claimed in claim 13 further including a summer for summing said audible message signal produced by said generator into said receive signal path.

18. An apparatus as claimed in claim 17 further including a gain controlled receive amplifier in said receive signal path and controlled by said mute controller such that the gain of said gain controlled receive amplifier is reduced after said customer premise equipment alerting signal is received.

19. An apparatus as claimed in claim 18 wherein said summer is positioned in said receive signal path prior to said gain controlled receive amplifier.

20. An apparatus as claimed in claim 19 wherein said mute controller increases the gain of said gain controlled receive amplifier before said audible message signal is inserted.

21. An apparatus as claimed in claim 20 wherein said mute controller reduces the gain of said gain controlled receive amplifier after said audible message signal has been inserted.

22. An apparatus as claimed in claim 21 wherein said mute controller increases the gain of said gain controlled receive amplifier before said audible message signal is inserted.

23. An apparatus as claimed in claim 22 wherein said mute controller reduces the gain of said gain controlled receive amplifier after said audible message signal has been inserted.

24. An apparatus as claimed in claim 13 wherein said audible message includes a tone signal.

25. An apparatus as claimed in claim 24 wherein said tone has a frequency of approximately 440 Hertz.

26. An apparatus as claimed in claim 13 wherein said audible message includes a synthesized voice message.

27. A method of signalling a telephone user of a call waiting while said telephone is on hold, the method including:

a) receiving a customer premise equipment alerting signal from said central office while a transmit signal path and a receive signal path in said telephone are muted;

b) un-muting said receive signal path in response to said customer premise equipment alerting signal;

c) generating and inserting an audible message signal into said receive signal path in response to said customer premise equipment alerting signal to notify a user that said customer premise equipment alerting signal has been received; and d) re-muting said receive signal path after said audible message signal has been inserted into said receive signal path.

28. An apparatus offerable to signal a telephone user of a call waiting while a telephone is on hold, comprising a) a customer premise equipment alerting signal receiver in communication with a receive signal path in said telephone offerable to receive a customer premise equipment alerting signal from a central office while said telephone is on hold;

b) a generator in communication with said receive signal path generating and inserting an audible message signal into said receive signal path after said customer premise equipment alerting signal is received; and c) a mute controller in communication with said transmit signal path and receive signal path muting said transmit signal path and said receive signal path to place said telephone on hold, un-muting said receive signal path while said audible message signal is inserted into said receive signal path and re-muting said receive signal path after said audible message signal has been inserted.

* * * * *